United States Patent Office 3,399,247
Patented Aug. 27, 1968

3,399,247
PREPARATION OF CELLULAR POLYURETHANE
Erwin Windemuth, Leverkusen, and Günther Braun, Cologne-Flittard, Germany, assignors to Farbenfabriken Bayer Aktiengesellschaft, Leverkusen, Germany, a corporation of Germany
No Drawing. Continuation of application Ser. No. 454,198, May 7, 1965, which is a continuation of application Ser. No. 236,400, Nov. 8, 1962, which in turn is a continuation-in-part of application Ser. No. 784,084, Dec. 12, 1958. This application July 18, 1966, Ser. No. 566,085
Claims priority, application Germany, Dec. 31, 1957, F 24,726
13 Claims. (Cl. 260—824)

ABSTRACT OF THE DISCLOSURE

Polyethers containing terminal —NCO groups based on organic polyisocyanates, a polyalkylene ether polyol and an organo silicon compound, the organo silicon compound may be a silanol, a siloxane or the like which has free active hydrogen containing groups.

---

This application is a continuation of application Ser. No. 454,198, filed May 7, 1965, now abandoned, which in turn is a continuation of Ser. No. 236,400 filed Nov. 8, 1962, now abandoned, which is in turn a continuation-in-part of application Ser. No. 784,084, filed Dec. 12, 1958, now abandoned.

This invention relates generally to polyurethane plastics and, more particularly, to an improved method for making cellular polyurethane plastics from a polyalkylene ether and an organic polyisocyanate.

It has been proposed heretofore to prepare a cellular polyurethane by a process in which a polyalkylene ether either branched or linear and an organic polyisocyanate are reacted together. The polyalkylene ether has terminal hydroxyl groups and may be reacted first under substantially anhydrous conditions with an excess of polyisocyanate to prepare an isocyanate-modified polyester having terminal —NCO groups. The resulting product is then reacted in a second step with water to form the cellular product. In an alternate procedure, the water, polyalkylene ether and organic polyisocyanate may all be mixed together substantially simultaneously. A polyether having terminal hydroxyl groups and having sulfur ether bridges either with or without oxygen ether bridges or polyalkylene ethers having more than two hydroxyl groups may be utilized in these processes instead of or along with a polyalkylene ether having only oxygen ether linkages.

It has been the custom to include in the reaction mixture catalysts and emulsifiers and compounds which stabilize the foam as it is formed. Silicone oils have been used most extensively as the stabilizing agent. These silicone oils are nonreactive with the other components of the reaction mixture and may be represented by the general formula

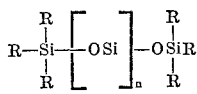

wherein R is an alkyl or aryl radical, such as methyl, ethyl, butyl or phenyl, and $n$ is zero or an integer. Although the product obtained when these silicone oils are included in the reaction mixture is more stable than that obtained without such a compound, the process has the disadvantage of being more complicated and troublesome than one in which the silicone oil is not included. The nonreactive silicone oils used heretofore are incompatible with the water and catalyst used in the reaction, so they must be thoroughly mixed with the polyether before the water, catalyst and other additives are added.

A method for making a siloxane resin foam from a resinous material, a hydrogen containing siloxane, such as, methyl hydrogen siloxane, methyl dihydrogen siloxane, diphenyl hydrogen siloxane or the like, and a hydroxylated compound is disclosed in U.S. Patent 2,833,732. The hydroxylated compound may be a diphenylsilanediol or similar compound. The foam prepared by this process is a rigid foam and is not a polyurethane foam. This foam is produced under substantially anhydrous conditions by heating the reaction mixture.

It is, therefore, an object of this invention to provide an improved method for making a polyurethane plastic from a polyether having terminal hydroxyl groups as the major resinous component. Another object of the invention is to provide a method for making a stable polyurethane foam by a process in which a polyether having terminal hydoxyl groups is reacted with an organic polyisocyanate. Still another object of the invention is to improve processes for making cellular polyurethanes from polyethers having terminal hydroxyl groups or terminal isocyanates.

The foregoing objects and others are accomplished in accordance with this invention, generally speaking, by reacting an organic polyisocyanate with water, a polyalkylene ether having terminal hydroxyl groups and an organosilicon compound having at least one terminal hydrogen atom reactive with NCO groups. More specifically, the invention contemplates a process for making a stable polyurethane foam wherein the reaction mixture contains an organosilicon compound having at least one hydrogen atom which is reactive with an —NCO group of a polyisocyanate and are, therefore, built into the polyurethane molecule along with the polyalkylene ether having terminal hydroxyl groups.

The organosilicon compound having terminal hydrogen atoms which are reactive with isocyanate groups may be any compound of this type. The hydrogen atoms which will react with the isocyanate groups can be detected by the well-known Zerewitinoff-method. This method is described in Journ. American Society, 49, 3181 (1927). Typical groups containing reactive hydrogen are hydroxyl, carboxyl, primary and secondary amino groups. More preferably, the reactive hydrogen may be present in the organosilicon compound in form of hydroxyl-, carboxyl-, or primary or secondary amino groups. It may be a silanol of the general formula $$(R)_x—Si—[OR_1]_y$$

In this formula R is selected from the group consisting of an alkyl radical, linear or branched, having from 1 to 20 carbon atoms, an aryl radical and an aralkyl radical. $R_1$ is selected from the group consisting of hydrogen, an alkyl radical having from 1 to 20 carbon atoms an aryl radical and an aralkyl radical with the proviso that at least one $R_1$ is hydrogen. $x$ and $y$ are integers the sum of which is 4.

Examples of suitable silanols include diethylsilandiol, triphenyl - silanol, diphenylsilandiol, methyl - phenylsilandiol, methyl-octadecylsilandiol, dibenzylsilandiol, methyltolylsilandiol, trimethyl-silanol, di-tert.butylsilandiol.

Another class of suitable organosilicon compounds are the linear and branched organosiloxanes. These organosiloxanes are known to have repeating units (1) $R—Si—O_{3/2}$ (2) $R_2Si—O_{2/2}$ and (3) $R_3—Si—O_{1/2}$ In these building units of an organosiloxane R represents lower alkyl, such as methyl, ethyl, propyl, or phenyl. It is of course not necessary for all the three building blocks to be present in every organo siloxane. Thus, for instance, the linear chain of an organo siloxane consists mainly of units (2), e.g.

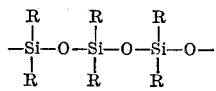

Unit (1) represents sometimes a branching point of the siloxane molecule, e.g.

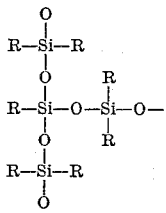

Unit (3) is characteristic for a terminal group of a linear siloxane chain, e.g.

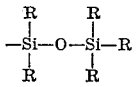

In fact, a plurality of one or more of these building units are arranged in any desired manner in the siloxane molecule depending on the kind and respective amounts of the starting monomers. Comprehensive description of siloxanes is, for instance, given in Eugene G. Rochow, An Introduction to the Chemistry of the Silicones, John Wiley and Sons Inc., New York, Second Edition; or in R. N. Meals and F. M. Lewis, Silicones, Reinhold Publishing Corporation, New York, 1959.

The condition to make the siloxane useful for the purpose of the present process is that the organo siloxane must contain at least one hydrogen atom reactive with NCO groups, in other words, must contain at least one terminal hydroxyl group. That means that in addition to one or more of the above three types of building units the molecule must contain at least one unit (4) H—O$_{1/2}$ Examples of suitable organo siloxanes consisting of units (2) and (4) are tetramethyldisiloxanediol, tetraethyldisiloxanediol, dimethyldiphenyldisiloxanediol, hexamethyltrisiloxanediol, tetrapropyldisiloxanediol, tetraphenyldisiloxanediol, decamethylpentasiloxanediol and their higher homologues.

Examples consisting of units (2), (3) and (4) are pentamethyldisiloxanol, pentaphenyldisiloxanol, heptamethyltrisiloxanol and their higher homologues.

Examples of suitable organo siloxanes consisting of units (1), (2), (4) are

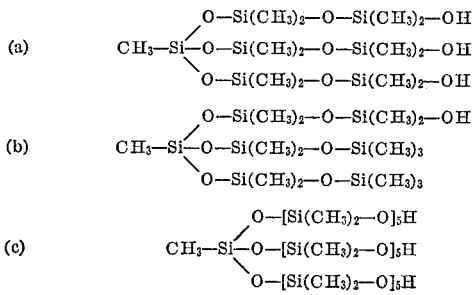

and their higher homologues

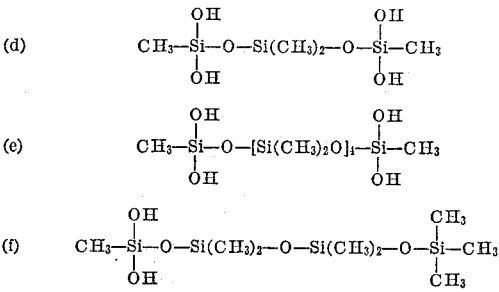

and their higher homologues.

It is noted that compounds (b) and (f) also contain building unit (3). In these examples methyl can be substituted wholly or partially by ethyl or phenyl.

Another class of suitable organo silicon compounds are ethers prepared from the above silanols or organo siloxanes and a polyhydric alcohol, amino alcohol, hydroxy carboxylic acid. In other words, the hydroxyl groups of the silanols are etherified with hydroxyl groups of a polyhydric alcohol, an amino alcohol or a hydroxy carboxylic acid. These etherification procedures provide for modified silanols and organo siloxanes having free hydroxyl, carboxyl or primary or secondary amino groups. Polyhydric alcohols are for instance ethylene glycol, propylene glycol, butylene glycol, trimethylpropane, pentaerythritol, glycerine, xylitol and sorbitol. Linear or branched polyesters with terminal hydroxyl groups, polyester amides with terminal hydroxyl groups and polyether with terminal hydroxyl groups, for instance those described below, are useful for the etherification purposes as well. Aminoalcohols are for instance aminoethanol, aminobutanol, N-ethyl amino ethanol, N-phenylamino ethanol and also polyester amides with terminal hydroxyl and amino groups. Hydroxy carboxylic acids are for instance lactic acids, ω-hydroxy caproic acid, α,α'-dihydroxy adipic acid and also polyesters or polyesteramides with terminal hydroxyl and carboxyl groups. The polyesters, polyethers and polyesteramides should have a molecular weight preferably not higher than 5000. When a silanol or organo siloxane is to be modified by etherification the amounts should be such that free hydroxyl, amino or carboxyl groups remain.

The modification by etherification of the silanols and organo siloxanes can also be brought about by adding alkylene oxides, such as ethylene oxide, propylene oxide or butylene oxide to the hydroxyl groups of the silanols and organo siloxanes.

Literature references as to the etherification of the hydroxyl groups of silanols and organo siloxanes are to be found in Walter Noll, Chemie und Technologie der Silicone, Weinheim, Verlag Chemie, 1960.

Any suitable polyether having terminal hydroxyl groups such as, for example, a polyalkylene ether glycol prepared by condensation of ethylene oxide, propylene oxide, butylene oxide, amylene oxide, or mixtures thereof or other suitable alkylene oxide, may be used. A polyalkylene ether having more than two hydroxyl groups prepared by condensation of an alkylene oxide including those just mentioned with a polyhydric alcohol, such as, for example, trimethylol propane, glycerine, pentaerythritol or the like, may be used. Other suitable polyethers include polythioethers having terminal hydroxyl groups prepared by condensation of a thioglycol, such as, for example, thiodiglycol or by condensation of a thioglycol with an alkylene oxide, such as one of those mentioned hereinbefore. The polyether may also be prepared by condensation of a glycol, such as, ethylene glycol or a polyhydric alcohol, such as, for example, trimethylol propane, glycerine, butane triol, castor oil, pentaerythritol, or the like with a suitable alkylene oxide, thioglycol or mixture thereof. Styrene oxide, epichlorohydrin or the like may be included in the condensation if desired. A suitable polyether may also be prepared by polymerization of tetrahydrofuran. It is preferred that the polyether having terminal hydroxyl groups have a molecular weight of at least about 400 and most preferably not above about 5,000 although polyether having a molecular weight above 5,000 may be used in some instances. The polyether should preferably have a hydroxyl number of from about 200 or less. Seldom will the hydroxyl number be less than about 10.

The invention also contemplates the use of either linear or branched addition products obtained by addition of one of the above-mentioned alkylene oxides with amino alcohols or amines. Ethanolamine, diethanolamine, triethanolamine, aniline or any suitable alkylene diamine, such as, for example, ethylene diamine, tetramethyl diamine, hexamethylene diamine or the like, may be condensed with the alkylene oxide to form a suitable polyether having terminal hydroxyl groups. Polyaddition products of polyacetals and olefines of the type disclosed in the U.S. patent application Ser. No. 768,057 (filed by Rudolph Merten on Oct. 20, 1958) now United States Patent 3,081,343, granted Mar. 12, 1963, may also be used as the resinous component to be reacted with the organic polyisocyanate along with the organosilicon compound having terminal hydroxyl groups in accordance with this invention.

The polyethers having terminal hydroxyl groups may be prepared by known methods. For example the process disclosed in "Encyclopedia of Chemical Technology," vol. 7, pp. 257 to 262, published by Interscience Publishers, Incorporated, 1951, may be used.

The invention also contemplates a process wherein the polyethers having terminal hydroxyl groups are used in admixture with other polyfunctional compounds, such as, for example, water, amino alcohols, such as, ethanolamine or the like, amines, such as, ethylene diamine or the like, 1,4-butylene glycol, trimethylol propane, pentaerythritol, castor oil, hydroxy ethyl aniline, N-alkyl ethanolamines including N-ethyl ethanolamine or the like.

Any suitable organic polyisocyanate may be used in accordance with this invention. Preferably the organic polyisocyanate is a diisocyanate, such as, for example, tetramethylene diisocyanate, hexamethylene diisocyanate, 1,4-cyclohexyl diisocyanate, toluylene-2,4-diisocyanate, toluylene-2,6-diisocyanate, a mixture of 2,4-toluylene diisocyanate and 2,6-toluylene diisocyanate, such as a mixture containing 80 percent 2,4-toluylene diisocyanate and 20 percent 2,6-toluylene diisocyanate, 4,4'-diphenylmethane diisocyanate, 1,5-naphthalene diisocyanate and the like. The organic polyisocyanate may contain chlorine, nitro or alkoxy substituents. Examples of suitable polyisocyanates having more than two —NCO groups include 1-methyl benzene, 2,4,6-triisocyanate and the product obtained when polyhydric alcohol is reacted with an excess of an organic diisocyanate, such as, for example, the reaction product of one mol of trimethylol propane, glycerine or the like, with three mols of 2,4-toluylene diisocyanate or similar organic diisocyanate. Other suitable organic diisocyanates are disclosed in German Patent No. 951,168. It is, thus, apparent that the invention contemplates broadly the use of any organic polyisocyanate useful in the preparation of a cellular polyurethane.

In a preferred embodiment of the invention, the polyether having oxygen and/or sulfur ether bridges and at least two terminal hydroxyl groups is mixed with the organosilicon compound and the resulting mixture is reacted with an organic polyisocyanate present in excess over that required to react with all of the functional groups of the organosilicon compound and polyether. If the process used is a two-step process in which the polyether is reacted under substantially anhydrous conditions in the first step with an organic polyisocyanate to form a prepolymer having terminal —NCO groups and water is added to the prepolymer and unreacted polyisocyanate in a second step, the organosilicon compound may be added to the reaction mixture in either the first or second step. In another embodiment of the invention, the organosilicon compound is mixed together with the organic polyisocyanate and with the polyether to form a foam in a one-step process. In this process, it is, of course, necessary to choose the proportions in such a manner that unreacted isocyanate is available to react with the organosilicon compound. In other words, the amount of polyisocyanate used must be in excess over all of the reactive hydrogen atoms in the organosilicon compound as well as in the polyether and the water.

The amount of organosilicon compound used will vary somewhat with the particular polyether having terminal hydroxyl groups utilized as the resinous product. It will also vary somewhat with the degree of stabilization required with the foam. Seldom will it be necessary, however, to use more than about 10 percent by weight based on the weight of polyether used. It is preferred to use from about 0.01 percent to about 10 percent and most preferably from about 0.5 percent to about 5 percent of the organosilicon compound based on the weight of polyether used.

The same manipulative steps are used in this process as in the heretofore known processes. An apparatus of the type disclosed in U.S. Patent 2,764,565 may be used to mix the various components together. The foam may be prepared by simply mixing water with the prepolymer in the two-step process and if desired catalysts, such as, for example, N-ethyl morpholine, triethylamine or similar tertiary amine catalysts including those disclosed in U.S. Patent 2,764,565. Dyes, fillers and plasticizers may also be included in the reaction mixture if desired. The viscosity of the isocyanate-modified polyether, or in other words the prepolymer, and the —NCO content thereof can be regulated by controlling the amount of polyisocyanate used. Ordinarily, the various components are mixed together at room temperature in the foaming step, but elevated temperatures up to about 60° C. or more may be used.

The modified-polyethers containing radicals derived from organosilicon compounds may be used for making either elastic, semi-rigid or rigid foams. Foam materials with a low bulk density are obtained from modified polyethers having a high isocyanate content while foams having a higher bulk density are obtained from modified polyethers having a low isocyanate content.

EXAMPLE 1

About 70 parts by weight of a linear polypropylene glycol ether with a molecular weight of about 2,000, an OH number of about 56 and a viscosity of about 42.4 cp./75° C. are mixed with about 2.1 parts by weight of about a 75% solution in xylene of an ether of phenyl methyl siloxane (about 5% hydroxyl groups) and a polyester obtained from about 1 mol of dimethyl terephthalate, about 0.7 mol of ethylene glycol and about 1 mol of trimethylol propane. The xylene is removed from the mixture of components at about 80° C. in a vacuum of about 14 mm. Hg, and then about 0.007 part by weight of benzyl chloride, about 0.042 part by weight of iron acetyl acetonate dissolved in a little benzene and about 4.06 parts by weight of toluylene diisocyanate containing the isomers toluylene-2,4-diisocyanate and toluylene-2,6-diisocyanate in the ratio of about 65:35 are added. The temperature is raised to about 120° C. for about 140 minutes. An addition product with a viscosity of about 538 cp./75° C., which no longer contains any isocyanate groups, is obtained.

About 26 parts by weight of toluylene diisocyanate of the same composition as that mentioned above are added at about 90° C. to about each 100 parts by weight of the said reaction product and the temperature is raised for about 180 minutes to about 120° C. A modified polyether which has an —NCO content of about 8.1% and a viscosity of about 485 cp./75° C. is formed.

In order to produce a foam material, about 100 parts by weight of the modified polyether are thoroughly mixed with about 2 parts by weight of dimethyl aminoethoxy propane, about 0.5 part by weight of triethylamine and about 1.8 parts by weight of water. The mass immediately begins to foam and solidifies in the course of about 1 hour to form a foam material having the following properties:

Bulk density, kg./m.³ _____ 41
Elasticity, percent _____ 41
Tensile strength, kg./cm.² _____ 1.81
Breaking elongation, percent _____ 421
Compression hardness (20%), g./cm.² _____ 25
Compression hardness (40%), g./cm.² _____ 32
Permanent deformation according to D 1055–52 T, Paragraph B (ASTM), percent _____ 22

EXAMPLE 2

About 46.6 parts by weight of the linear polypropylene glycol ether used in Example 1 are mixed with about 23.4 parts by weight of a trifunctional polyalkylene glycol ether obtained by addition of propylene oxide to glycerine and with about 2.8 parts by weight of the etherification product of phenyl methyl siloxane used in Example 1. After distilling off the xylene at about 80° C. under a vacuum of about 20 mm. Hg, about 0.0043 part by weight of iron acetyl acetonate, 0.012 part by weight of benzoyl chloride and also about 3.57 parts by weight of toluylene diisocyanate of the same composition as that used in Example 1, are added. After reaction time of about 120 minutes at about 120° C., a reaction product of higher molecular weight and free from —NCO groups is obtained, which product has a viscosity of about 490 cp./75° C.

About 26.5 parts by weight of toluylene diisocyanate are added at about 85° C. to about 100 parts by weight of this reaction product and the temperature is raised for about 1 hour to about 100° C. A modified polyether which has an —NCO content of about 8.0% and a viscosity of about 472 cp./75° C. is formed.

An elastic foam material is obtained therefrom if about 100 parts by weight of the modified polyether are stirred with the activator mixture used in Example 1. The foam material is characterized by the following properties:

Bulk density, kg./m.³ _____ 43
Elasticity, percent _____ 48
Tensile strength, kg./cm.² _____ 1.17
Breaking elongation, percent _____ 312
Compression hardness (20%), g./cm.² _____ 20
Compression hardness (40%), g./cm.² _____ 27
Permanent deformation according to D 1055–52 T, Paragraph B (ASTM), percent _____ 17

It is to be understood that any of the other organosilicon compounds disclosed herein as suitable can be substituted for those used in the foregoing working examples. Likewise, any of the other suitable polyalkylene ethers may be substituted for the particular ones used in the foregoing examples. Furthermore, any other suitable organo polyisocyanate may be substituted for the specific one used in the examples.

The following polyalkylene ethers are employed in Example 3:

Ether A: Linear polypropylene glycol, molecular weight 2000; hydroxyl number 56.

Ether B: Polyaddition product of propylene oxide to trimethylol propane having a molecular weight of 3000 and a hydroxyl number of 56.

Ether C: Polyaddition product of propylene oxide to xylitol with 3.2% of OH groups.

Ether D: Polyaddition product of propylene oxide to trimethylol propane; hydroxyl number 112.

Ether E: Polyaddition product of propylene oxide to trimethylol propane; hydroxyl number 240.

Ether F: Linear polypropylene glycol having a hydroxyl number of 270.

Ether G: Polyaddition product of propylene oxide to ethylene diamine; hydroxyl number 81.5.

The following organosilicon compounds are employed in Example 3:

Silicon H: A branched phenyl methyl polysiloxane with terminal hydroxyl groups.

Silicon J: Tetramethyl disiloxane diol.

Silicon K: Polyaddition product of 24 mols of propylene oxide to 1 mol of tetramethyl disiloxane diol.

The following tertiary amine catalysts are employed in Example 3:

Catalyst L: N-ethyl morpholine.

Catalyst M: Triethylamine.

Catalyst N: Ethoxydimethyl propanol amine.

EXAMPLE 3

The polyalkylene ether (the amounts are indicated in the following table) is mixed with the indicated amount of organosilicon compound and with the given amount of a technical mixture of 2.4- and 2.6-toluylene diisocyanate (80:20). After reaction time of about 120 minutes at about 120° C. a reaction product of higher molecular weight is obtained which product has an NCO content of about 8.0 to 8.5%.

An elastic foam material is obtained from these prepolymers by adding thereto the amount of water indicated in the following table together with the indicated amount of tertiary amine catalyst. The foam material is characterized by a high elasticity and a very good permanent deformation value.

| | | | | | | |
|---|---|---|---|---|---|---|
| Ether A | 60 | 70 | | 80 | 90 | |
| Ether B | 40 | | 90 | | | |
| Ether C | | 30 | | | | |
| Ether D | | | | 10 | | 90 |
| Ether E | | | | | 10 | |
| Ether F | | | 10 | | | |
| Ether G | | | | 10 | | 10 |
| Silicon H | 3 | | | | | |
| Silicon J | | 0.5 | | | 1.0 | 2.5 |
| Silicon K | | | 2.0 | 1.5 | 1.0 | |
| Toluylene diisocyanate | 34 | 36.5 | 37.8 | 35.3 | 38.0 | 34.2 |
| Water | 2.8 | 3.0 | 3.0 | 2.8 | 3.0 | 2.9 |
| Catalyst L | 2 | | 2.0 | 1.5 | 1.0 | 2.5 |
| Catalyst M | | 0.3 | | 0.1 | 0.5 | 0.2 |
| Catalyst N | 1 | 3 | 1.5 | 1.5 | 1.0 | |

The parts given in the table are by weight.

EXAMPLE 4

A mixture of 50 parts by weight of linear polypropylene glycol (molecular weight 2000, hydroxyl number 56); 60 parts by weight of a polyaddition product of propylene oxide to trimethylol propane (molecular weight 3000, hydroxyl number 56) are mixed with 1 part of the polyaddition product of 24 mols of propylene oxide to 1 mol of tetramethyl siloxane diol. The mixture is heated to 100° C. for some minutes. After cooling, 0.2 part of dibutyl stannic laurate, 0.2 part of N,N'-trimethyl-4-(β-aminoethyl)-piperazine 3 parts of water and 39 parts of a technical mixture of 2.4- and 2.6-toluylene diisocyanate (80:20), are added to the mixture. Foaming starts at once. A highly elastic foam material is obtained having a permanent deformation of less than 10%.

The invention is useful for making upholstery, insulation, sponges and the like.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a polyether containing terminal NCO groups which comprises reacting an excess of an organic polyisocyanate with a polyalkylene ether having terminal hydroxyl groups and an organo silicon compound selected from the group consisting of (1) a silanol having the formula:

wherein R is selected from the group consisting of an alkyl radical having from 1 to 20 carbon atoms, an aryl radical and an aralkyl radical; $R_1$ is selected from the group consisting of hydrogen, an alkyl radical having from 1 to 20 carbon atoms, an aryl radical and an aralkyl radical with the proviso that at least one $R_1$ is hydrogen; and $x$ and $y$ are integers the sum of which is 4; (2) a siloxane consisting of the repeating units selected from the group consisting of:

$$R—Si—O_{3/2}, R_2Si—O_{2/2} \text{ and } R_3—Si—O_{1/2}$$

wherein R is selected from the group consisting of alkyl and phenyl and each molecule contains at least one $H—O_{1/2}$; (3) an ether prepared by reaction between a member selected from the group consisting of (1) and (2) and a polyhydric alcohol; (4) an ether prepared by reaction between a member selected from the group consisting of (1) and (2) with an amino alcohol; (5) an ether prepared by reaction of a member selected from the group consisting of (1) and (2) wtih an hydroxy carboxylic acid; (6) an ether prepared by condensation of an alkylene oxide and a member selected from the group consisting of (1) and (2); each of said group members (3), (4), (5) and (6) containing at least one —OH group.

2. The process of claim 1 wherein the organo silicon compound is a silanol having the formula:

$$(R)_x—Si—OR_{1y}$$

wherein R is selected from the group consisting of an alkyl radical having from 1 to 20 carbon atoms, an aryl radical and an aralkyl radical; $R_1$ is selected from the group consisting of hydrogen, an alkyl radical having from 1 to 20 carbon atoms, an aryl radical and an aralkyl radical with the proviso that at least one $R_1$ is hydrogen; and $x$ and $y$ are integers, the sum of which is 4.

3. The process of claim 1 wherein the organo silicon compound is a siloxane consisting of the repeating units selected from the group consisting of:

$$R—Si—O_{3/2}, R_2Si—O_{2/2} \text{ and } R_3—Si—O_{1/2}$$

wherein R is selected from the group consisting of alkyl and phenyl and each molecule contains at least one $H—O_{1/2}$.

4. The process of claim 1 wherein the organo silicon compound is group member (3) of claim 1.

5. The process of claim 1 wherein the organo silicon compound is group member (4) of claim 1.

6. The process of claim 1 wherein the said polyalkylene ether is a triol prepared by condensation of an alkylene oxide with a trihydric alcohol.

7. The process of claim 1 wherein the polyalkylene ether contains hetero sulfur atoms.

8. The process of claim 1 wherein the polyisocyanate is an organic diisocyanate.

9. The process of claim 1 wherein the polyalkylene ether is a polyalkylene ether glycol.

10. The process of claim 1 wherein from about 0.01 percent to about 10 percent by weight organosilicon compound based on the weight of polyalkylene ether is used.

11. The process of claim 1 wherein the organosilicon compound is mixed with the polyalkylene ether prior to mixture of either of the two with the polyisocyanate.

12. A prepolymer having terminal NCO groups prepared by a process which comprises reacting an excess of an organic polyisocyanate with a polyalkylene ether having terminal hydroxyl groups and an organo silicon compound selected from the group consisting of (1) a silanol having the formula:

$$(R)_x—Si—OR_{1y}$$

wherein R is selected from the group consisting of an alkyl radical having from 1 to 20 carbon atoms, an aryl radical and an aralkyl radical; $R_1$ is selected from the group consisting of hydrogen, an alkyl radical having from 1 to 20 carbon atoms, an aryl radical and an aralkyl radical with the proviso that at least one $R_1$ is hydrogen; and $x$ and $y$ are integers the sum of which is 4; (2) a siloxane consisting of the repeating units selected from the group consisting of:

$$R—Si—O_{3/2}, R_2Si—O_{2/2} \text{ and } R_3—Si—O_{1/2}$$

wherein R is selected from the group consisting of alkyl and phenyl and each molecule contains at least one $H—O_{1/2}$, (3) an ether prepared by reaction between a member selected from the group consisting of (1) and (2) and a polyhydric alcohol; (4) an ether prepared by reaction between a member selected from the group consisting of (1) and (2) with an amino alcohol; (5) an ether prepared by reaction of a member selected from the group consisting of (1) and (2) with an hydroxy carboxylic acid; (6) an ether prepared by condensation of an alkylene oxide and a member selected from the group consisting of (1) and (2); each of said group members (3), (4), (5) and (6) containing at least one —OH group.

13. The process of claim 1 wherein the organo silicon compound is an ether of phenyl methyl siloxane and a polyester prepared by esterification of a polycarboxylic acid and a polyhydric alcohol.

References Cited

UNITED STATES PATENTS

| | | | |
|---|---|---|---|
| 3,050,477 | 8/1962 | Gmitter et al. | 260—2.5 |
| 3,194,773 | 7/1965 | Hostettler | 260—2.5 |
| 3,246,048 | 4/1966 | Haluska | 260—46.5 |

FOREIGN PATENTS 866,324   4/1961   Great Britain.

DONALD E. CZAJA, Primary Examiner.

M. I. MARQUIS, Assistant Examiner.